Patented Dec. 5, 1922.

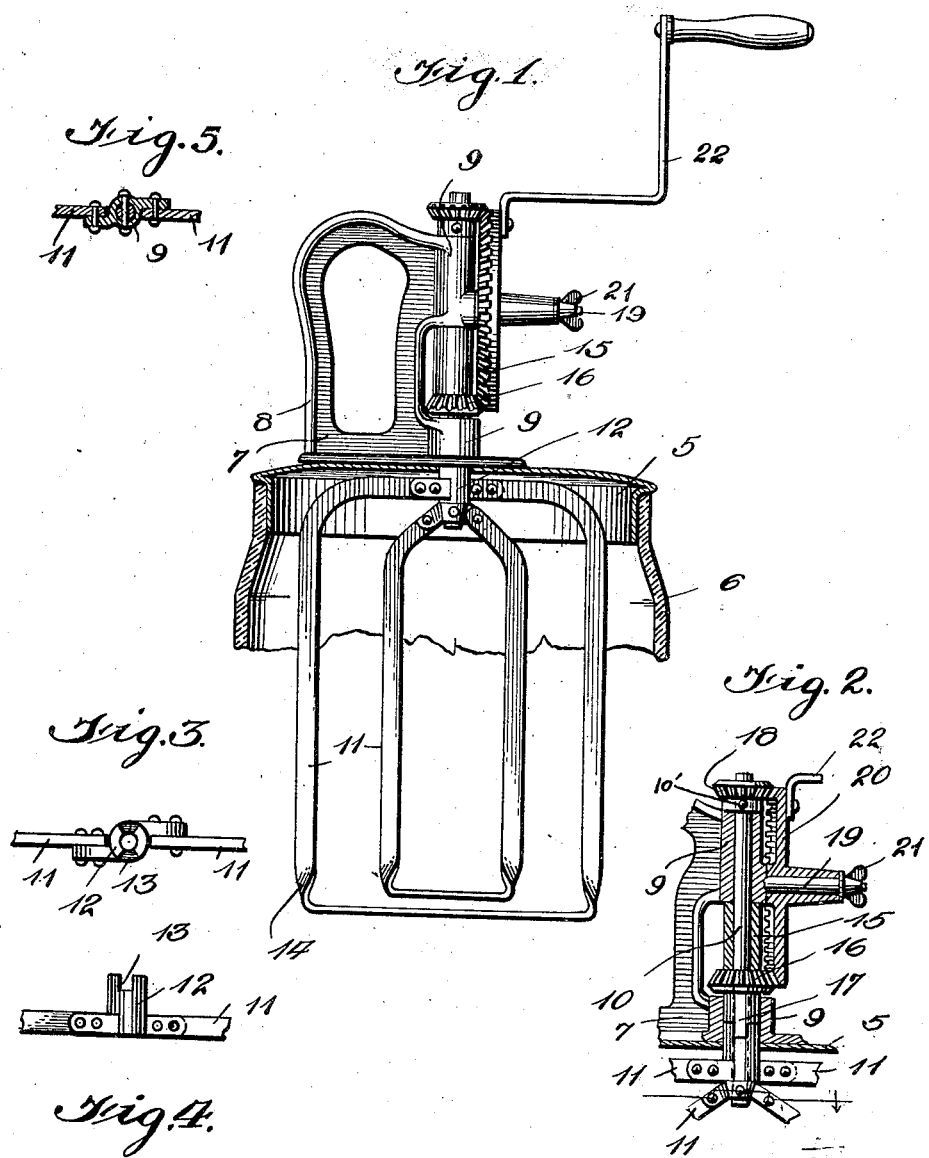

1,437,567

UNITED STATES PATENT OFFICE.

WILLIAM F. STEWART, OF QUINCY, ILLINOIS.

CHURN.

Application filed April 2, 1921. Serial No. 457,934.

*To all whom it may concern:*

Be it known that I, WILLIAM F. STEWART, a citizen of the United States, and resident of Quincy, in the county of Adams and State of Illinois, have invented a new and useful Churn, of which the following is a specification.

My invention relates to churns and has as its principal object the provision of a mechanism that may be mounted in various types of jars or receptacles for agitating churning the contents thereof.

A further object of the invention resides in the provision of a churn or mixing mechanism employing a cover from which dashers are suspended and carrying an operating mechanism, and which is so constructed as to permit the cover to be placed on any type of receptacle and the contents agitated.

With the preceding and other objects and advantages in mind, the invention consists in the novel combination of elements, construction and arrangement of parts and operations to be hereinafter more fully described, claimed and illustrated in the accompanying drawing, wherein:

Figure 1 is a side elevation of my improved churn in operative position in a receptacle;

Figure 2 is a fragmentary sectional view of the churn operating mechanism;

Figure 3 is a fragmentary plan view of one of the dashers;

Figure 4 is a side elevation of the same; and

Figure 5 is a fragmentary sectional view of the same.

Referring in detail to the drawing wherein like characters of reference designate like parts throughout the several views, the numeral 5 designates a cover to be mounted in a receptacle 6 as shown in Figure 1.

Mounted upon the cover 5 is a bracket 7 formed with a handle 8 and vertically alined bearings 9. Journaled in the bearings 9 and passing centrally through the cover 5 is a shaft 10 to the lower end of which a substantially rectangular dasher or stirrer 11 is fixed. Rotatably mounted upon the lower end of the shaft 10 between the upper end of the dasher 11 and the cover 5 is a sleeve 12 provided with notches 13, and carried by this sleeve 12 is a substantially rectangular dasher or stirrer 14 of a materially greater size than the stirrer 11 and is adapted for rotation in a direction opposite to the direction of rotation of the stirrer 11.

Mounted on the shaft 10 and disposed between the bearings 9 is a sleeve 15 and rotatable on this shaft between the bearings 9 is a bevel gear 16 which carries downwardly extending lugs 17 at its lower end having interlocking engagement with the notches 13 in the sleeve 12. Disposed on the upper end of the shaft 10 is a second beveled gear 18 adapted to drive the shaft 10 to rotate the dasher 11. Passing transversely through this gear 18 and engaging the upper end of the shaft 10 is a removable pin 10′. By simply removing the pin 10′ the shaft carrying with it the dashers 11 may be removed from the bearings. The two dashers can then be separated from each other for the purpose of cleansing or repairing the same.

Extending laterally from the upper bearing 9 is a stub shaft 19 upon which a drive gear 20 is journaled and which meshes with the gears 16 and 18 to drive the dashers in opposite directions. A wing nut 21 is threaded upon the end of the stub shaft 19 whereby to firmly hold the gear 20 against the gears 16 and 18.

It will be thus seen that as the parts wear, the wing nut 21 may be tightened to compensate for this wear.

Carried by the drive gear 20 is an operating handle 22 whereby the former is rotated.

It is to be understood that the form of my invention herein shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

A churn comprising a cover adapted to be mounted on a receptacle, a bracket mounted upon the upper face of the cover and provided with vertically alined bearings, a shaft journaled in the bearings and passing through the cover, a dasher fixed to the lower end thereof, a pinion revoluble on the shaft intermediate the ends thereof and carrying downwardly extending lugs, a sleeve revoluble on the shaft and provided with notches having interlocking engagement with the lugs, a dasher fixed to the sleeve, a pinion removably fixed to rotate with the upper end of the shaft, and a drive gear meshing with the pinion.

WILLIAM F. STEWART.